Patented Nov. 28, 1950

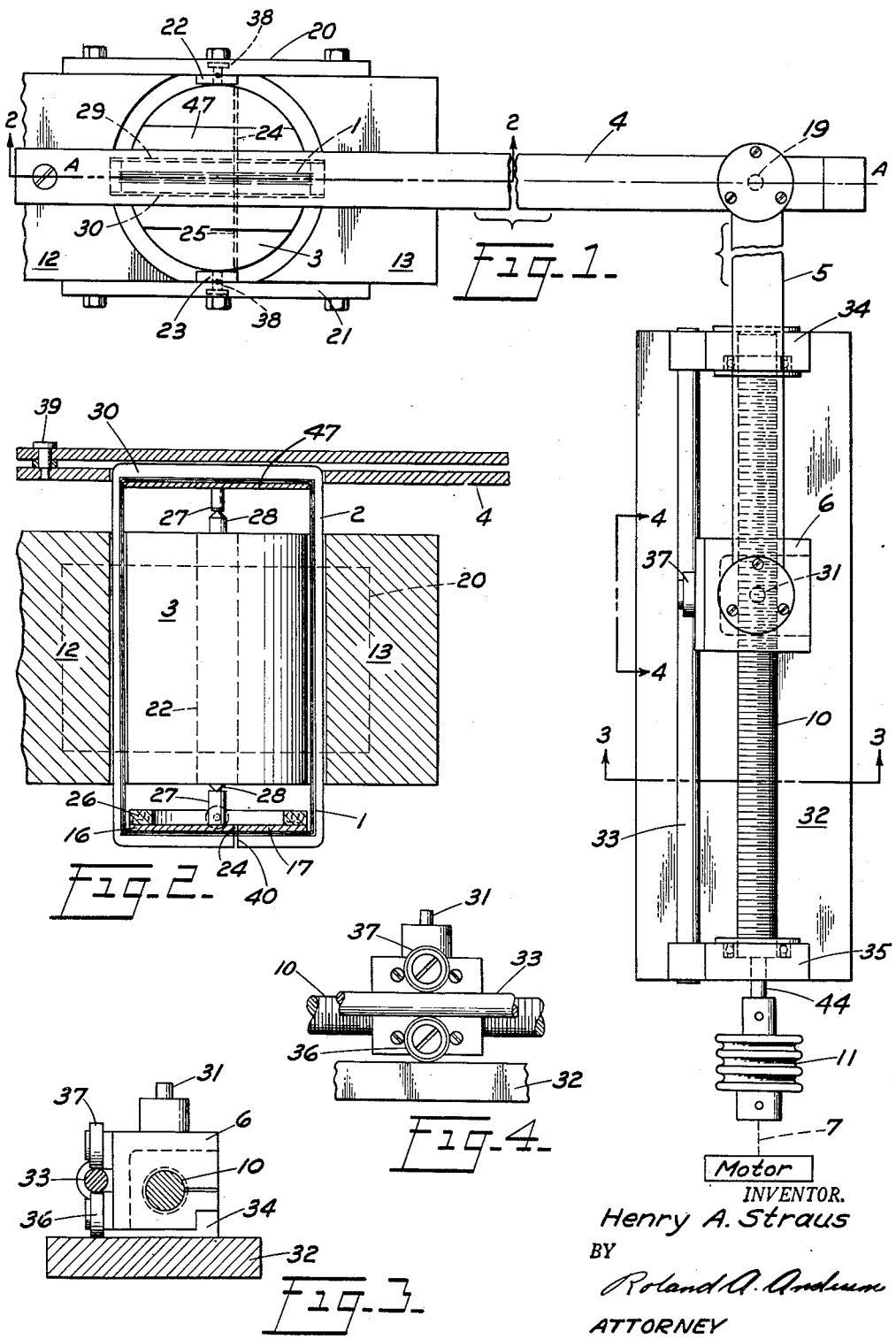

2,531,833

UNITED STATES PATENT OFFICE 2,531,833

TACHOMETER

Henry A. Straus, Baltimore, Md. assignor to the United States of America as represented by the United States Atomic Energy Commission Application December 2, 1949, Serial No. 130,823

3 Claims. (Cl. 171—209)

The present invention relates to a tachometer, and especially to apparatus for producing an electrical voltage proportional to the instantaneous speed of rotation of a shaft which is free to move only a limited number of revolutions in either direction.

With present very fast servomechanisms, such sensitivity is attainable that the noise voltage fluctuations of even the best available tachometers may cause the servomechanism to oscillate. The noise voltage may be caused by the brushes and by bar to bar commutator noise, and is, at best, of the order of 5% of the signal voltage.

Where only a limited number of revolutions of a shaft are necessary, a tachometer may be constructed which avoids brushes and commutators, and which, consequently, may be used with a very rapid servomechanism. Accordingly, it is a primary object of the present invention to provide, for a shaft of limited travel, a tachometer which produces a minimum of noise voltage at its output.

A further object of my invention is to provide a tachometer adapted to deliver at its output a D. C. voltage with very low ripple component.

In accordance with my invention, a shaft of limited rotational movement is coupled to a device for converting the angular motion of the shaft to a corresponding angular movement of a coil of wire disposed within a suitably shaped magnetic field. A voltage is induced in the coil of wire as it moves through the field, and that voltage will be determined by the shape and strength of the field, the number of turns in the coil, the speed of angular rotation of the coil, and its position in the field. If the strength of the radial field is made substantially constant throughout the arc cut by the coil, which arc must extend less than 90 degrees from the centered position in the structure, then the induced voltage is substantially proportional to the angular velocity of the coil, and hence is proportional to the angular velocity of the shaft. With the field so shaped, the voltage induced in the coil will be independent of coil position within the arc over which the coil is free to move.

In a preferred form of my invention, I couple the shaft whose speed I desire to measure to an accurately-machined threaded shaft, which carries thereon a traveling member. That member is coupled to one end of a linkage member, the opposite end of which is pivotally joined to one end of a second linkage member. The other end of the second linkage member spans a coil form mounted in a magnetic field, so as to turn the coil through a limited arc when the traveling member sets the linkage in motion.

The principle of operation of my invention can be best understood when read in conjunction with the annexed figures, in which:

Fig. 1 is a plan view of a preferred form of my invention;

Fig. 2 is a sectional view of the pole pieces and coil mounting members, taken along line 2—2 of Fig. 1;

Fig. 3 is a sectional view of the threaded member and its associated supports and guides, taken along line 3—3 of Fig. 1;

Fig. 4 is a fragmental view showing a side elevation of the traveling member, guides and supports, taken along line 4—4 of Fig. 1.

Referring now to Fig. 1, the shaft 7 of a motor, the speed of which is to be converted to a proportional voltage, may be joined through coupling 11 to a shaft 44, an extension of threaded shaft 10. The coupling is preferably a bellows-type, including a pair of sleeves at opposite ends for engaging shafts 7 and 44. The shaft 10 may be an accurately machined, hardened, and lapped lead screw, mounted in ball bearings housed in bearing supports 34, 35, and may, for example, carry four threads, at twenty threads per inch. The supports 34, 35 are fixed to a large steel mounting plate 32 by metal screws not shown.

The shaft 10 carries thereon the traveling member or nut 6, threaded internally to close tolerance in order to eliminate all possible backlash. The member 6 is constrained from rotation about the shaft 10 by two ball bearings 36, 37, mounted on one side of the nut as illustrated in Figs. 3 and 4. Bearing 37 rests on shaft 33 to prevent counterclockwise motion of the nut, as viewed in Fig. 3, while bearing 36 engages the under side of shaft 33 and the surface of plate 32. Cylindrical shaft 33 is mounted in the housings 34, 35, and parallels the shaft 10.

Linkage member 5 may be a metal bar of any convenient length, for example 12 inches, measured between the axes of precision bearings for receiving pins 19, 31. One end of the bar is attached to the member 6 through engagement of upstanding pin 31 with a precision bearing in the bar, such that pivotal motion, free of radial play about the pin, is possible. The opposite end of the bar 5 is pivotally pinned to one end of link 4 by cylindrical pin 19, such that motion of bar 5 along the axis of screw 10 causes the pin 19 to move along an arc.

Member 4, as illustrated in Fig. 2, may comprise two metal bars joined by pins 19, 39 at opposite ends, the lower bar having a rectangular hole cut therein to fit snugly about the flanges 29, 30 of coil form 2 in such manner as to avoid shorting slot 40. Since the position of the magnet assembly is fixed relative to that of the screw 10, motion of the screw will cause a proportional linear motion of member 6 and link 5, and a corresponding angular motion of member 4 and form 2.

The coil form 2 supports the coil in the magnetic field provided by pole pieces 12, 13, and may be constructed from brass. In the embodiment illustrated in Fig. 2, the form is rectangular, enclosing a window 2.6 inches by 5.4 inches, and may be open-circuited by a slot 40, .05 inch wide, to prevent large eddy currents from building up therein. Such currents would tend to deform the magnetic field and would cause a heavy drag; that is, extra power would be required to overcome the drag in turning the coil.

Coil 1 may be wound on form 2 from any suitable wire, and with sufficient turns for producing at its terminals a signal of the desired amplitude. For example, 684 turns of copper wire wound on the form described above, when disposed in a field of about 5000 gauss, produces a satisfactory signal.

Means for producing the desired shape and strength of magnetic field for a particular application are varied. The pole pieces 12, 13, may be permanent magnets having adjacent concave faces of opposite polarity to produce a substantially radial magnetic field in at least that part of the air gap between them and the core through which coil 1 turns. Alternatively, an electrical winding may be employed in the conventional manner of electromagnets, in which case the pole pieces may be of steel, or other magnetic materials known to one skilled in the art. In the form illustrated, the field of about 5000 gauss is substantially radial for 65 degrees either side of line A—A, and the screw and linkage members are so constructed that coil 1 will turn no more than 65 degrees in either direction from center position along line A—A. For different requirements as to desired shaft rotation, however, it is to be understood that linkage and magnetic field shape could be readily altered by one skilled in the art so that the coil would complete its travel within a radial magnetic field, or so that a change in field strength would be otherwise compensated or corrected for.

To aid in establishing the magnetic field of high intensity about coil 1, a magnetically permeable core 3 is disposed between the pole faces. The core may preferably be a cylinder of soft iron just smaller than the window of the form 2. The clearance is not critical, and may be, for example, 0.4 inch. To maintain the magnetic circuit components in rigid alignment, lateral metal bars 20, 21 may be screwed to pole pieces 12, 13, and to metal bars 22, 23, fastened to core 3.

In order that the coil 1 may turn through the magnetic field, the form 2 may be pivotally mounted on ends of the core 3, as is best seen in the sectional view, Fig. 2. A convenient system of mounting includes the small cone bearings 28, fixed to core 3, and bearing members 27, fixed to metal members 16, 47, carried by opposite ends of form 2 and extending inwardly therefrom. One or both of the bearing members 27 should be electrically insulated from the form, to prevent current flow through the form, bearings and core.

Leads from the coil 1 may be brought out through slots 24, 25 between brass disc segments 16, 17, which are disposed inside form 2, and brazed to the inner surface of the form. A ring 26, 1¼ inches in radius, cut from an insulator of good dimensional stability, may be fastened to the upper surface of the brass segments. Terminals 38, 39, to which opposite ends of wire coil 1 may conveniently be fastened, may be mounted on opposite sides of the insulator ring, near the outer ends of slots 24, 25. The appropriate connections of a fast servomechanism may be brought out to the said terminals to connect with opposite ends of coil 1 in a typical application of my tachometer.

A further understanding of the principles of my invention and the advantages thereof may be had from a brief description of the operation of the embodiment of my tachometer illustrated in the figures.

Suppose shaft 7 may turn only 10 revolutions in either direction from its center position. With the shaft at the center position, the coil 1 on form 2 will be aligned substantially along axis A—A'. As the shaft 7 then turns, its motion is transmitted through coupling 11 and shaft 44 to screw 10. The screw turns, causing member 6 to move axially therealong, since it is constrained from rotation. Bar 5 moves with member 6, pushing or pulling on the end of member 4 pinned thereto at 19, and turning form 2 carrying the coil 1. As the coil turns through the magnetic field established by pole pieces 12, 13 an electromotive force is induced in the coil proportional to the rate at which the magnetic lines of flux are cut. That rate is a function of the axial motion of member 6, depending on the proportions of the linkage, hence is a function of the rotational speed of screw 10 and the rotational speed of the shaft 7.

The internal impedance of the unit described is of the order of 100 ohms, and the signal voltage generated, of the order of 3 volts at a shaft speed of 1200 revolutions per minute, is readily taken with respect to ground. That signal is free from noise voltage fluctuations and ripple components, hence may be used in extremely sensitive servo-mechanisms without introducing therein "hunting," or excessive oscillations.

Having thus described a preferred embodiment of my invention, I claim:

1. A tachometer comprising a pair of permanent magnets disposed in spaced relation to each other for producing a substantially radial magnetic field; a coil on a form mounted to move within said magnetic field to develop an electromotive force; and means for turning said coil through a limited arc in either direction responsive to the speed of said shaft, including a threaded member coupled to said shaft, a traveling member carried on the threaded member, a first link member pivotally coupled at one end to said traveling member, and a second link member coupled at one end to said form, the opposite ends of said link members being pivotally connected.

2. An improved tachometer comprising in combination means for producing a substantially radial magnetic field through a predetermined arc; a coil on a flanged slotted form pivotally supported in and acted upon by said field for producing an electromotive force; a core supported in said field; a first link bar having cut therein a recess for engaging the flanges of the top of said form; a second link bar pivotally coupled at one end to the opposite end of said first bar; a threaded shaft carrying a correspondingly threaded traveling member thereon, said second bar connected at its other end to said traveling member, and coupling means at one end of said shaft for connecting said shaft to a shaft the speed of which is to be measured.

3. An improved tachometer for measuring the speed of a rotating shaft free to turn through only a limited number of revolutions, comprising means for producing a radial magnetic field substantially uniform through a predetermined arc, a coil on a slotted form pivotally supported in said field, and means for turning said coil including a screw carrying a nut, means for coupling said screw to said rotating shaft, restraining means contacting said nut whereby it is prevented from rotating as said screw rotates, a pair of linkage members, the first member pivotally coupled near one end to said nut and the second member connected near one end to said form, the free ends of said members being rotatably joined together whereby axial motion of said nut is converted into rotational motion of said coil, said motion inducing in said coil an electrical potential proportional to the instantanous speed of rotation of said shaft.

HENRY A. STRAUS.

REFERENCES CITED

The following references are of record in the file of this patent:

UNITED STATES PATENTS

| Number | Name | Date |
| --- | --- | --- |
| 354,946 | Sperry | Dec. 28, 1886 |
| 465,808 | Thury | Dec. 22, 1891 |
| 1,937,677 | Weston | Dec. 5, 1933 |
| 2,441,760 | Giannini | May 18, 1948 |